R. CANNON & S. GRAY.
TIRE VULCANIZING ATTACHMENT FOR AUTOMOBILES.
APPLICATION FILED AUG. 10, 1915.
1,195,337.
Patented Aug. 22, 1916.
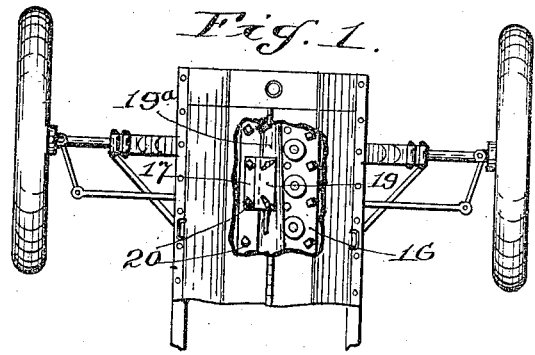
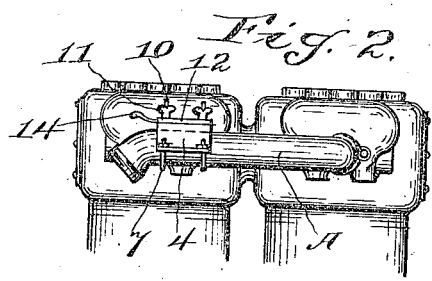
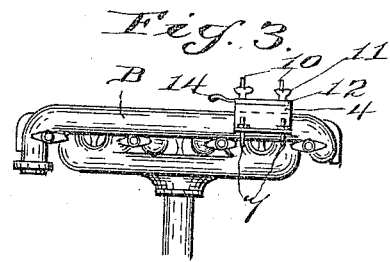
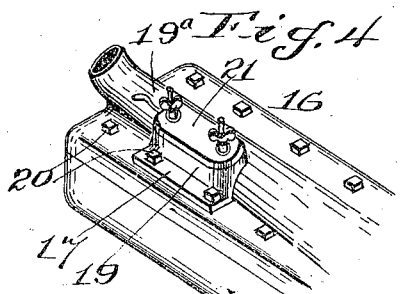
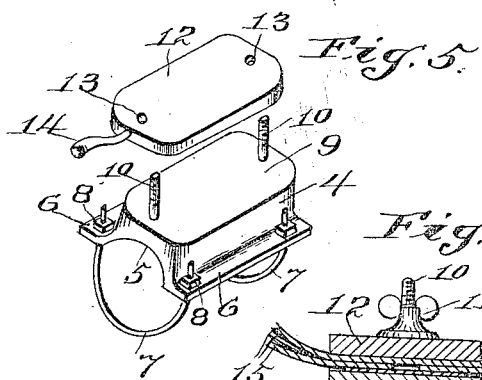
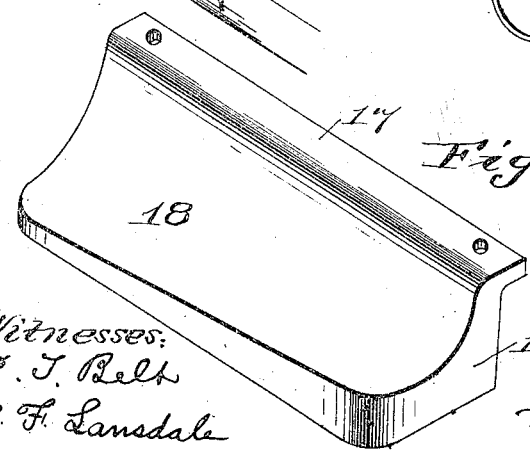
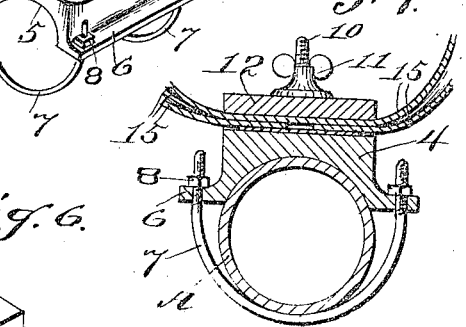
Witnesses:
C. T. Belt
R. F. Lansdale
Inventors
Ray Cannon and
Stanley Gray
By Faber & Whitman
Attorneys

UNITED STATES PATENT OFFICE.

RAY CANNON AND STANLEY GRAY, OF PAISLEY, OREGON.

TIRE-VULCANIZING ATTACHMENT FOR AUTOMOBILES.

1,195,337.  Specification of Letters Patent.  Patented Aug. 22, 1916.

Application filed August 10, 1915. Serial No. 44,715.

*To all whom it may concern:*

Be it known that we, RAY CANNON and STANLEY GRAY, citizens of the United States, residing at Paisley, in the county of Lake and State of Oregon, have invented certain new and useful Improvements in Tire-Vulcanizing Attachments for Automobiles, of which the following is a specification.

This invention relates to pneumatic tire repairing, and pertains especially to a vulcanizing device applicable to motor vehicles for vulcanizing patches in repairing tires.

The object of the invention is to provide a vulcanizing device adapted to be applied to and be carried upon the cylinder or exhaust pipe for repairing tires.

A further object of the invention is to provide a tire repair vulcanizing attachment for motor vehicles whereby the vulcanizer is constantly heated by the part of the vehicle or motor to which the vulcanizer is attached.

A still further object of the invention is to provide a novel and peculiar device attachable to certain heated parts of a vehicle motor for heating the device preparatory to vulcanizing repair of tires applied to said device.

Various other objects, advantages and improved results are attainable in the practical application and utilization of this vulcanizing attachment.

In the accompanying drawings forming part of this application:—Figure 1 is a top view of a chassis with the hood partly broken away showing the application of the invention. Figs. 2 and 3 are elevations showing the device as applied to the exhaust pipes of various motors. Fig. 4 is a perspective view of part of a motor jacket or cylinder showing another form of the vulcanizing device applied thereto. Fig. 5 is a perspective view of the vulcanizer shown in Figs. 2 and 3, with the cap plate raised for inserting a tire to be repaired. Fig. 6 is a perspective view of part of the vulcanizer shown in Fig. 1. Fig. 7 is a sectional view showing a tire clamped for vulcanizing.

The same reference characters denote the same parts throughout the several views of the drawings.

The vulcanizer is preferably intended to be permanently attached in operative position so that it may always be ready or in condition and position to repair punctured or fractured tires, by merely removing such tire from the wheel and applying it to the vulcanizer.

The vulcanizing device as applied to the exhaust pipes A and B, of the motors partly shown in Figs. 2 and 3 respectively, comprises a metal block member 4, having a concaved or semicircular under face 5, adapted to fit over a pipe as A and B, and provided with side flanges 6 having holes for the screw end of pipe binders 7, which are provided with suitable nuts 8. The member 4 has a smooth flat upper face 9, and clamping bolts 10 project from each end of the face 9, and are provided with suitable thumb nuts 11. The device further comprises a metallic cap or clamping plate 12, preferably of the same size as the upper face 9, and said plate has holes 13 through which the bolts 10 extend. The plate 12 is provided with a suitable handle 14, for removing and replacing the plate, in applying a tire 15 between the plate and the block 4.

The device as applicable to a cylinder or water jacket as 16, has only one side flange 17, and the under face 18 of the block 19 is beveled and shaped to conform with the surface of the cylinder or raised jacket 19ª and said flange is secured by the usual set bolts as 20, of the cylinder or jacket. In all other respects this block and its clamping plate 21, are the same as that of the device first described herein, except the beveled face provides for the inclined jacket pipe 19ª. Obviously these devices are maintained in heated condition by the operation of the motor or engine so that they are available for vulcanizing during the operation of the motor, and may be utilized for patching or repairing a spare tire during travel of the vehicle.

In applying a tire for vulcanizing, the cap plate is removed and the punctured or defective portion of the tire is placed upon the block with a vulcanizable patching material or compound, and the cap plate is screwed down for clamping the same during the process of vulcanizing, then the cap plate is lifted and the tire removed. This operation may be carried out without stopping, as usual, for repairing tires.

We do not wish to confine our invention as to size, shape or material, nor do we wish to be understood as limiting ourselves in the application of the invention, but reserve the right to make such changes and variations in the devices, and in the application thereof to such part or parts of an engine or vehicle motor as may come within the scope of the appended claim.

Having thus described our invention what we claim as new and desire to secure by Letters Patent is:—

A vulcanizing attachment for vehicle motor engines, comprising a solid block adapted to be permanently fixed to and carried by a heated portion of the engine in vulcanizing position, said block having a flat top forming the outer face of the block top, and a concave inner face, the side wall of the block having an inner concaved face, a flange projecting from the lower end of the wall, the inner face of the top and of the wall being beveled lengthwise the block, a clamping plate fitting said top face, and means for securing the plate.

In testimony whereof we affix our signatures in presence of two witnesses.

RAY CANNON.
STANLEY GRAY.

Witnesses:
 CHAS. UMBACH,
 VE UMBACH